March 12, 1957 J. C. MILLER 2,784,597
FLEXIBLE ANGULAR SHAFT DRIVE
Filed Aug. 3, 1953

INVENTOR.
JACOB C. MILLER
BY
Andrus & Sceales
Attorneys

United States Patent Office 2,784,597
Patented Mar. 12, 1957

2,784,597

FLEXIBLE ANGULAR SHAFT DRIVE

Jacob C. Miller, Milwaukee, Wis., assignor to Badger Meter Mfg. Company, Milwaukee, Wis., a corporation of Wisconsin Application August 3, 1953, Serial No. 371,838

2 Claims. (Cl. 74—18.1)

This invention relates to the transmission of rotary motion through a positive seal and particularly to means providing for the increased serviceability of the sleeve member of the seal and the reduction to a minimum of the torque required to transmit such rotary motion through the seal.

The invention provides a bearing means disposed within the sleeve to support the sleeve against collapse and otherwise provide for the frictional contact with the shaft to preclude the sleeve from contact with the shaft.

An object of the invention is to increase the serviceability of an angular shaft drive seal.

Another object is to reduce the torque required to transmit rotary motion through the shaft seal.

Another object is to support the sleeve against pressures developed on the outside of the sleeve.

Another object is to develop a shaft seal which is readily assembled.

Another object is to provide a seal particularly adaptable for water meters which may be entirely assembled from one side of the wall or partition through which the rotary transmission is to be accomplished.

These and other objects and advantages will be more fully set forth in the following description of a preferred embodiment of the invention as illustrated in the accompanying drawing.

Figure 1:
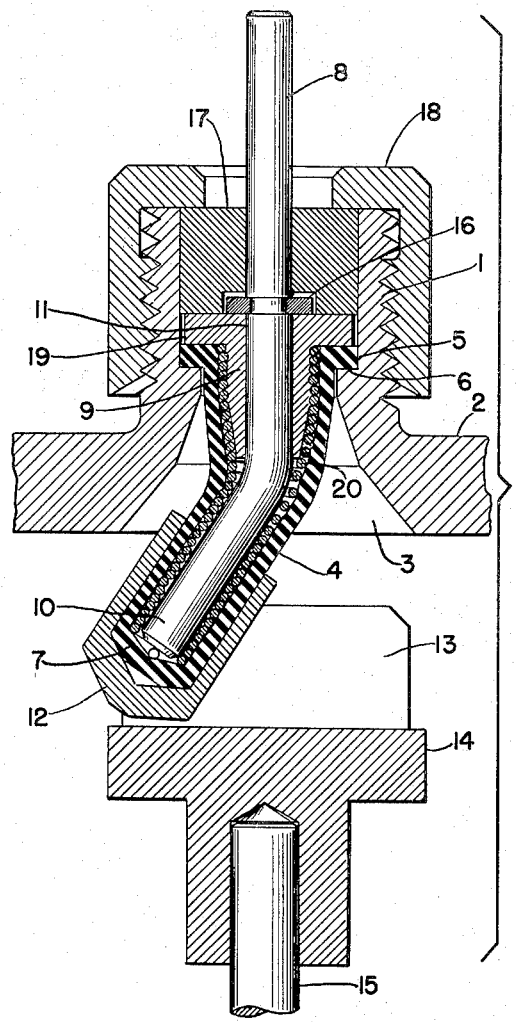
Figure 1 is a vertical axial section taken through the mechanism including a part of the driven element mounted on the driven shaft.
Figure 2:
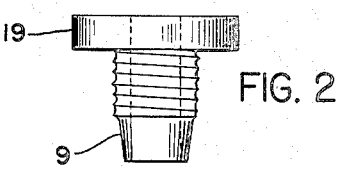
Fig. 2 is an elevation of the shaft bearing member.
Figure 3:
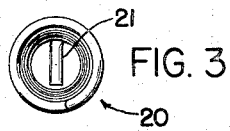
Fig. 3 is a top plan view of the coil member which supports the sleeve against frictional engagement with the shaft.
Figure 4:
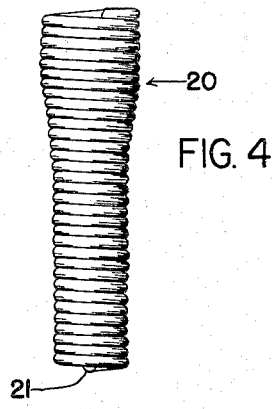
Fig. 4 is a side elevation of the coil showing the same in normal position.
Figure 5:
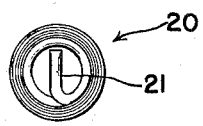
Fig. 5 is an end view of the coil shown in Fig. 4.
Figure 6:
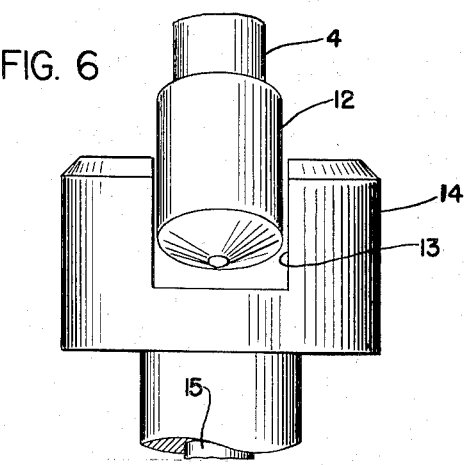
Fig. 6 is an elevation of the lower end of the sleeve and the driven element shown at 90° of the position shown in Figure 1.

The bearing housing 1 shown in the drawing is formed integrally with the wall 2 to define the opening 3 in which the drive mechanism is installed. The wall 2 may form a part of a water meter housing or other machine element and may also be formed separately of the bearing housing 1. The tapered portion of the opening 3 in the wall is of a size necessary to accommodate the movement of the sleeve 4 which extends through the opening 3.

Sleeve 4 is of molded, flexible material and is provided with the annular flange 5 molded integrally therewith at the larger open end thereof. The flange 5 is secured against the annular shoulder 6 formed adjacent to opening 3 and the other smaller end of the sleeve is closed as at 7 to provide the positive closure of opening 3.

Sleeve 4 is adapted to receive the shaft 8 and the bushing 9 supporting the shaft for rotation. The end 10 of shaft 8 extends to the inner closed end 7 of the sleeve and is angularly disposed with respect to the axis of the bore 11 in bushing 9 in which the shaft is rotatable so that the rotation of shaft 8 effects a gyratory movement of the lower closed end of the sleeve.

The thimble 12 is mounted over the closed end 7 of sleeve 4 to protect the sleeve against wear and fits within the slot 13 of the rotatable element 14 secured to the shaft 15. Shaft 15 is suitably supported for rotation by bearing means, not shown, in substantial alignment with shaft 8 whereby rotation of either one of shafts 8 and 15 effects the corresponding rotation of the other shaft.

Shaft 8 is secured axially by the collar 16 fixed on the shaft between bushing 9 and the bearing member 17 which is mounted in housing 1 and secured therein by the threaded cap 18. Bushing 9 is provided with the annular flange 19 which fits within housing 1 and between the flange 5 of sleeve 4 and member 17 whereby the turning of cap 18 effects the tightening of flange 5 of sleeve 4 against shoulder 6.

Bushing 9 is provided with the helical groove to receive and carry the larger end of the coil 20 which extends within sleeve 4 around shaft 8 and the angular portion 10 of the shaft. The end 21 of the coil is turned inwardly to extend across the end face of shaft 8 at the closed end 7 of sleeve 4.

The intermediate portion of coil 20 is tapered where the coil extends from bushing 9 onto shaft 8 and the lower portion of the coil is of a diameter to provide a running fit with shaft 8.

Coil 20 is formed of a relatively soft spring wire which will withstand the flexing at the angular portion of shaft 8 and supports the sleeve 4 from any collapse by fluid pressure exerted on the outside of the sleeve. Coil 20 provides for the friction-bearing support of sleeve 4 on shaft 8 and relieves the closed end of the sleeve against any torsional stresses by reason of the relative rotation of the shaft and sleeve. The small spaces between the turns of the coil allow for the introduction of a suitable lubricant as may be desired and which, with rotation of the shaft in one direction tends to be carried or distributed by the helix of the coil throughout the length thereof.

Various embodiments of the invention may be employed within the scope of the following claims.

I claim:

1. In a drive mechanism of the class described, a bearing housing defining the opening to be sealed and having an annular shoulder adjacent thereto, a flexible sleeve having a closed free end and a flange formed integrally therewith at the opposite open end thereof and mounted within said housing and against the shoulder thereof to close the opening, a bushing secured within said housing and securing the flange of said sleeve against the annular shoulder, a shaft rotatably supported by said bushing and having an end portion extending angularly within said sleeve to the closed end thereof, said bushing extending partially within and into said sleeve and having a helical groove formed in the outside thereof, a wire coil having one end mounted on said bushing and fitting said groove formed therein and extending therefrom over said shaft within said sleeve to the closed end thereof, a rotatable element having a shaft rotatably mounted in alignment with the axis of said first named shaft and engageable by the free end of said sleeve whereby the rotation of either of said shafts effects the rotation of the other, said sleeve being supported by said coil member against torsion by reason of the relative rotation of said first named shaft and sleeve and against collapse and frictional wear.

2. In a device of the class described including a shaft having an angularly formed end portion and a rotatable element having a shaft supported independently of said first shaft and disposed relative to said angular end portion for mutual engagement offset from the axes thereof whereby the rotation of either of said shafts effects the rotation of the other, a flexible sleeve having a closed free end extending over the angularly formed portion of said first shaft and having a fixed opposite open end, a fixed bushing mounted on said first shaft within said sleeve at the open end thereof and having a helical groove therein, and a wire coil having one end mounted in the groove on the outside of said bushing within said sleeve and extending from said bushing on said first named shaft within said sleeve to provide the bearing support of the sleeve on said first shaft, said coil having an inwardly turned end portion extending across the end face of said first shaft at the closed end of said sleeve, said coil supporting said sleeve against collapse and against the rotary motion which tends to be imparted to the sleeve by the rotation of said first named shaft and the frictional engagement of the sleeve with said element.

References Cited in the file of this patent

UNITED STATES PATENTS

| | | |
|---|---|---|
| 1,314,867 | Gray | Sept. 2, 1919 |
| 2,607,233 | Bosch | Aug. 19, 1952 |
| 2,610,410 | L'Abee-Lund | Sept. 16, 1952 |

FOREIGN PATENTS

| | | |
|---|---|---|
| 136,710 | Great Britain | Dec. 24, 1919 |